R. R. ROBERTSON.
ETCHING APPARATUS.
APPLICATION FILED MAY 11, 1920.

1,393,315.

Patented Oct. 11, 1921.
3 SHEETS—SHEET 1.

WITNESS
H. A. Sherburne

INVENTOR
Robert R. Robertson
BY
White Frost Evans
his ATTORNEYS

R. R. ROBERTSON.
ETCHING APPARATUS.
APPLICATION FILED MAY 11, 1920.
1,393,315.
Patented Oct. 11, 1921.
3 SHEETS—SHEET 2.
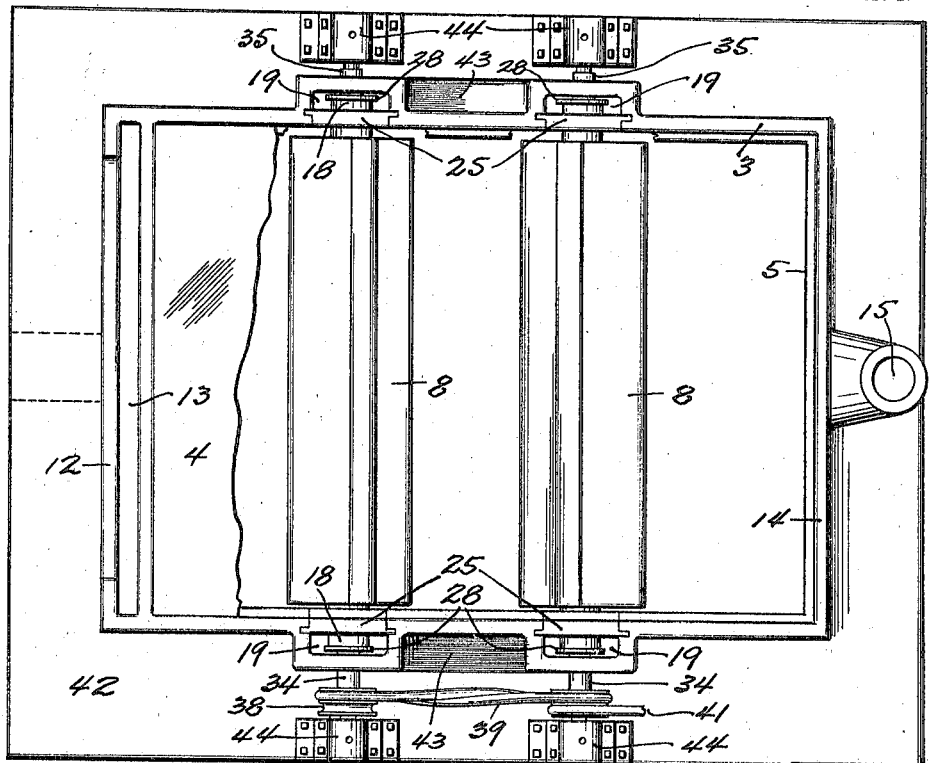
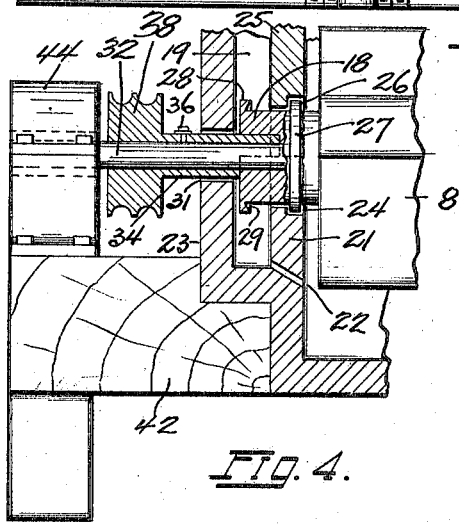
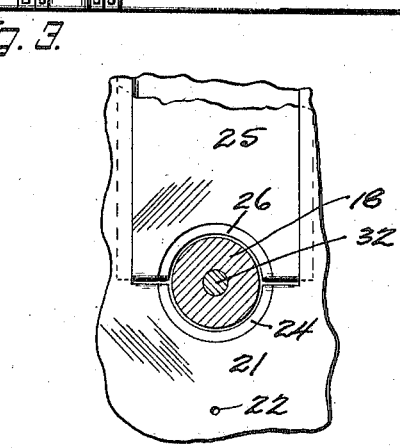
WITNESS
INVENTOR
Robert R. Robertson.
BY
his ATTORNEYS

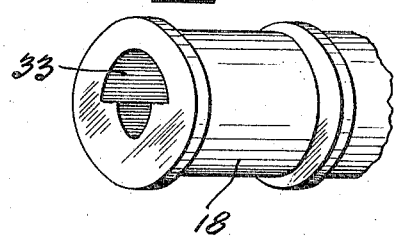
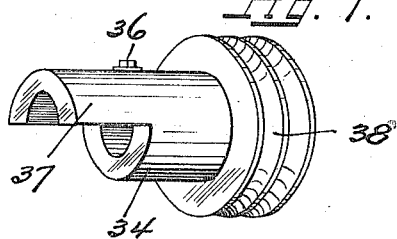
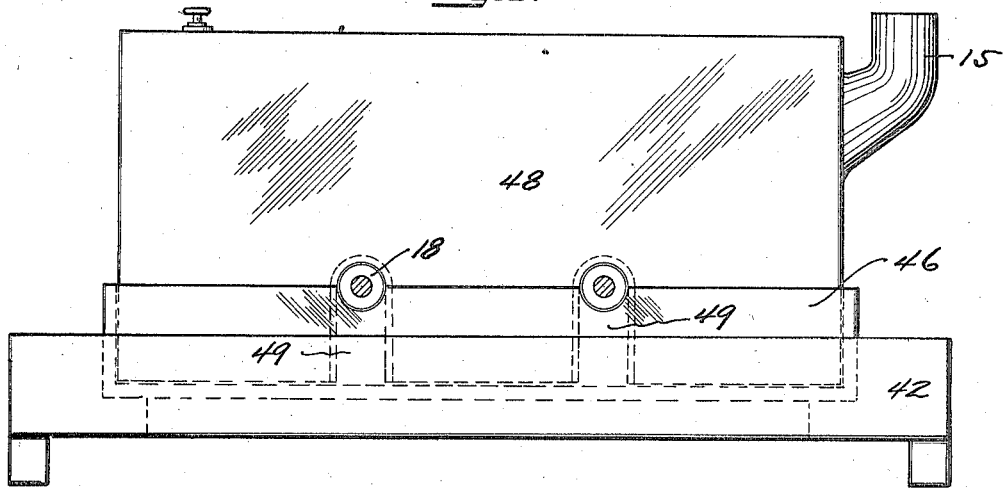
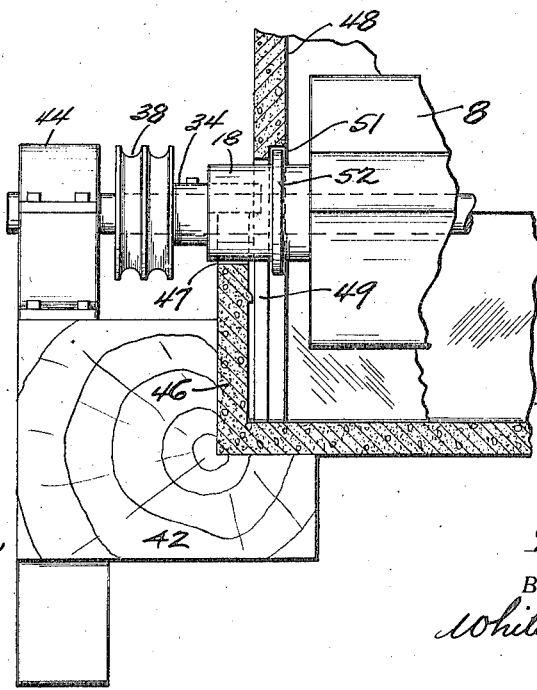

UNITED STATES PATENT OFFICE.

ROBERT R. ROBERTSON, OF BERKELEY, CALIFORNIA.

ETCHING APPARATUS.

1,393,315. Specification of Letters Patent. Patented Oct. 11, 1921.

Application filed May 11, 1920. Serial No. 380,522.

*To all whom it may concern:*

Be it known that I, ROBERT R. ROBERTSON, a citizen of the United States, and a resident of Berkeley, county of Alameda, and State of California, have invented a certain new and useful Etching Apparatus, of which the following is a specification.

The invention relates to an apparatus for etching plates with etching fluid.

An object of the invention is to provide an etching apparatus which operates to subject the plate to a uniform etching fluid spray over its entire surface.

Another object of the invention is to provide an etching apparatus which operates to reduce undercutting of the plate to a minimum.

A further object of the invention is to provide an etching apparatus which operates to cause an abundant flow of air through the etching chamber.

A further object of the invention is to provide an etching apparatus in which all parts which may be deleteriously affected by the etching fluid are shielded from contact therewith.

The invention possesses other advantageous features, some of which, with the foregoing, will be set forth at length in the following description, where I shall outline in full that form of the invention which I have selected for illustration in the drawings accompanying and forming part of the present specification. In said drawings I have shown one embodiment of my invention, but it is to be understood that I do not limit myself to such form, since the invention, as set forth in the claims, may be embodied in a plurality of forms.

Referring to said drawings:

Fig. 3 is a plan view of the acid receptacle with the cover removed.

Fig. 4 is a cross section of one end of a sprayer and the receptacle, showing the driving connection.

Fig. 5 is a section taken on the line 5—5, Fig. 4.

Fig. 6 is a perspective view of the sprayer hub.

Fig. 7 is a perspective view of a driving sleeve.

Fig. 8 is an elevation of a modified form of apparatus.

Fig. 9 is a section taken on the line 9—9, Fig. 8.

Figure 1:
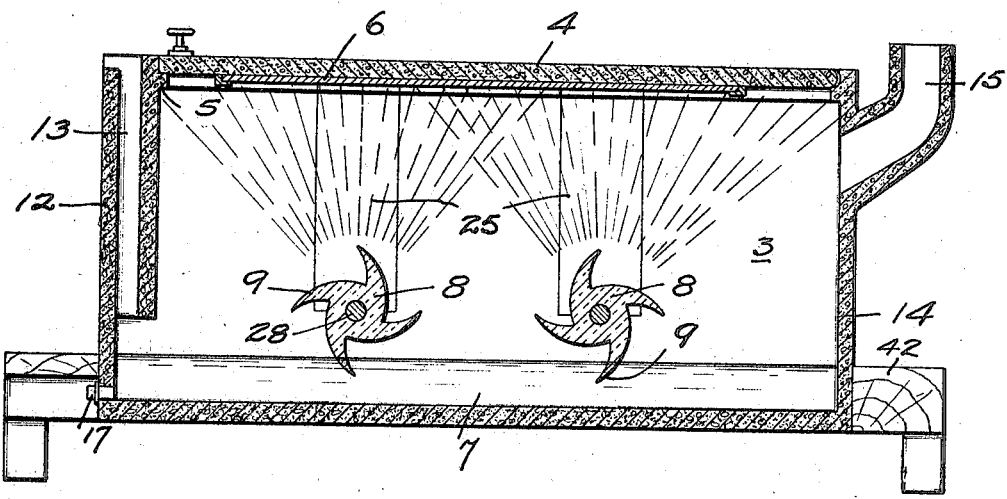
Figure 1 is a vertical longitudinal section through one form of apparatus of my invention.

The apparatus of my invention comprises a receptacle 3, preferably of rectangular shape, made of earthenware or other material, which is proof against the acid or etching fluid. The receptacle is provided with an acid proof cover 4, seating on a flange 5 on the interior of the receptacle and the plate 6, to be etched, is suitably and releasably held to the under side of the cover. The chamber contains a quantity of etching fluid 7 and sprayers 8 are arranged in the casing to project a fluid spray against the plate. The sprayers are preferably formed as rotary impellers, the blades 9 of which dip into the fluid and discharge the fluid in a spray against the surface of the plate. By providing a plurality of sprayers spaced apart longitudinally of the compartment, the fluid particles from the sprayers strike the plate perpendicularly and at a small angle to the perpendicular, so that undercutting of the plate is reduced to a minimum. The impellers preferably rotate in opposite directions, as indicated on the drawings, but that is not essential to the operation of the apparatus.

The etching operation is greatly facilitated by the presence of an abundant supply of air in the etching chamber, and I have provided means for producing a flow of air through the chamber. The end wall 12 of the receptacle 3 is thickened and is provided with a passage or conduit 13 opening at the top of the receptacle to the atmosphere and opening at its other end into the chamber at such depth that etching fluid is not thrown out through the passage as the sprayers revolve. The opposite end wall 14 is provided with a vent conduit 15. The impellers are constructed and rotated in such manner as to cause a continual inflow of air through the conduit 13 which air is mixed with the spray and brought into contact with the plate 6 and the excess air, spent air and etching fluid fumes, continually discharge through the conduit 15. The receptacle is usually provided with a draining aperture, normally closed by the plug 17.

The impellers or sprayers are made of a material not deleteriously affected by the etching fluid, such as earthenware, wood or acid-proof iron and are provided on their ends with integral hubs 18 which extend into pockets formed in the sides of the receptacle. The receptacle is provided on opposite sides with vertically disposed pockets 19, there being two opposed pockets for each impeller. The lower portion of the pocket is defined by an inner wall 21, having a drain passage 22, connecting the pocket and the receptacle, and an outer wall 23. The inner wall is provided at its upper edge with a semi-circular depression or aperture surrounded by semi-circular depression 24. The pocket is closed, above the inner wall 21, by a sliding gate 25, of acid proof material, which fits in guideways at the sides of the pocket. The gate is provided at its lower end with a semi-circular depression or aperture surrounded by a semi-circular depression 26. When the gate is in position, the two semi-circular apertures form a circular aperture between the pocket and the interior of the receptacle and the hub 18 extends through this aperture. The semi-circular depressions 24 and 26 form a circular seat in which the inner flange 27 of the hub is disposed, the flange acting to obstruct the passage of etching fluid through the hub aperture and into the pocket. The inner face of the flange is sunk below the surface of the gate and the inner wall, so that any etching fluid flowing down the gate will not flow into the pocket. The hub is also provided with an outer flange 28 having an undercut face 29 which acts to deflect any leakage fluid backward and away from the metallic collar. The outer wall 23 of the pocket is provided with an aperture 31 axially alined with the aperture in the inner wall, and the collars extend through the apertures 31 and into engagement with the hubs.

The impeller is provided with a longitudinal bore through which a metallic shaft 32 extends, the shaft extending from the hubs and through the apertures in the outer walls of the pockets. The hubs are provided in their ends with semi-circular sockets 33, partly surrounding the shaft 32, and the shaft is held fixed to the impeller by collars 34 and 35 surrounding the shaft and fixed thereto by set screws 36 and having semi-circular extensions 37 fitted into the sockets 33 in the hubs. The collar 34 is provided with grooved or slotted pulleys 38 which are connected together by a belt 39, and a driving belt 41 connected to a suitable source of power, provides the means for driving the impellers.

The receptacle 3 is seated on a suitable base or frame 42, preferably formed of wood, and having depressions 43 therein in which the lower ends of the pockets are disposed, thereby positioning the receptacle on the base. The shafts 32 extend from the collars 34 and 35 and are journaled in bearings 44, secured to the base. The collars and hubs are held free from contact with the receptacle, so that the impellers rotate freely in their bearings and the pockets and the hub flanges prevent contact of the etching fluid with the metallic parts of the apparatus.

By virtue of this construction, the plate is not only subjected to a uniform spray over its entire surface, which strikes the plate approximately perpendicularly, but an abundant supply of air is provided in the etching chamber. Further, all parts which may be deleteriously affected by contact with the etching fluid, are maintained out of contact with the fluid and the construction of the apparatus is such that the parts exposed to the fluid may be formed of fluid-proof material.

I have found that an impeller having longitudinally extending parallel vanes, smoothly curved along their inner and outer surface, will produce a uniform spray over the surface of the plate. Each vane is substantially concave-convex in cross section and of gradually increasing thickness from edge to base, forming pockets in which the fluid is picked up and from which it is projected over the edge of the vane as the impeller rotates.

Figure 2:
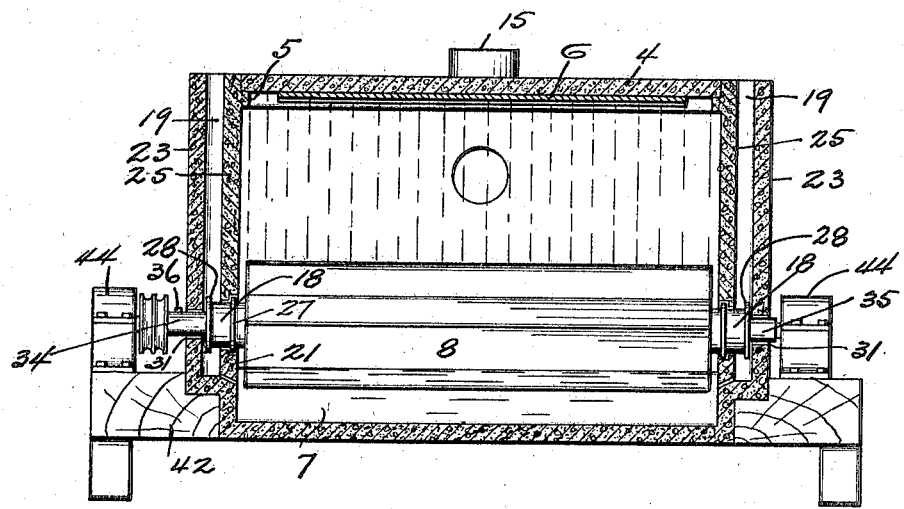
Fig. 2 is a vertical transverse section taken through one of the rotatable sprayers.

In Figs. 8 and 9 I have shown a modified form of construction which possesses several features of advantage. In this construction, the receptacle is formed in two parts, comprising an acid proof tray 46 having semi-circular apertures or depressions 47 formed in the upper edges of the side walls through which the sprayer hubs 18 extend. Seated in or on the tray is a fluid proof housing 48 provided with a cover, means for holding the plate and passages as above described, for providing an abundant flow of air through the receptacle. The housing 48 preferably sits into the tray and is provided on the lower edges of the side walls with elongated apertures having semi-circular upper walls 49. These apertures are wider than the hubs 18 and slip down over the hubs, so that the semi-circular apertures coöperate to form a circular aperture through which the hub extends. The housing is provided with a depression 51, surrounding the aperture therein, and the flange 52 on the hub seats in the depression and overlies the aperture, to prevent the discharge of etching fluid through the aperture. The sprayer is constructed, supported and driven in the same manner as in the construction shown in Fig. 2. In this latter construction, the impeller may be removed by lifting off the housing and opening the bearings or by releasing the collars and sliding out the shaft.

I claim:

1. An etching apparatus comprising a receptacle adapted to contain a quantity of etching liquid and provided with an air inlet passage extending downwardly into said receptacle and an outlet adjacent the top of the receptacle, means for supporting a plate to be etched in said receptacle, and rotatable sprayers in said receptacle adapted to discharge sprays of said liquid against said plate and for maintaining a circulation of fresh air through the receptacle.

2. An etching apparatus comprising a receptacle adapted to contain a quantity of etching liquid, an air inlet passage in one wall, an air outlet passage in the opposite wall of the receptacle, means for supporting a plate to be etched in said receptacle, and rotary means for discharging a spray of etching liquid against said plate, and for maintaining a constant circulation of fresh air through the receptacle at atmospheric pressure.

3. An etching apparatus comprising a receptacle adapted to contain a quantity of etching fluid, a rotatable sprayer in said receptacle, hubs on said sprayer, opposite walls of said receptacle being provided with semi-circular apertures, movable walls having semi-circular apertures in the lower edges coöperating with said first mentioned apertures to form circular apertures through which said hubs extend, flanges on said hubs, said walls being provided with depressions surrounding the apertures and in which said flanges are disposed, and means engaging one of said hubs for rotating the sprayer.

4. An etching apparatus comprising a receptacle adapted to contain a quantity of etching fluid having side walls provided with double walled pockets, the outer wall of the pockets having apertures therethrough and the inner walls of the pockets having depressions in their upper edges, a movable wall having a depression in its lower edge coöperating with the inner wall of each pocket, the two coöperating depressions forming an aperture alined with the aperture in the outer wall, a rotatable sprayer in said receptacle, hubs on said sprayer extending through said apertures and flanges on the hubs overlying said apertures.

5. An etching apparatus comprising a receptacle adapted to contain a quantity of etching fluid having side walls provided with double walled pockets, the outer walls of said pockets having apertures therethrough and the inner wall of said pocket terminating in the plane of the center of said aperture and having a semi-circular depression therein, gates slidably mounted in said receptacle in alinement with the inner pocket walls and having semi-circular apertures coöperating with said first mentioned semi-circular apertures to form circular apertures in alinement with the apertures in the outer walls, a rotatable sprayer in said receptacle, hubs on said sprayer extending through said apertures and flanges on said hubs lying on opposite sides of said inner walls.

6. An etching apparatus comprising a receptacle having apertures for the free flow of fresh air through the chamber of the receptacle, means for holding a plate horizontally, face down in the receptacle, and means for continually spraying an active liquid against the face of the plate and circulating fresh air at atmospheric pressure through the chamber.

In testimony whereof, I have hereunto set my hand.

ROBERT R. ROBERTSON.